United States Patent Office 3,048,614
Patented Aug. 7, 1962

3,048,614
PREPARATION OF ALKALI METAL SALTS OF GLYCOL MONOBORATES
Howard Steinberg, Fullerton, and Don L. Hunter, Long Beach, Calif., Maurice H. Pickard, Long Island, N.Y., and Lowell L. Petterson, Whittier, Calif., assignors to United States Borax & Chemical Corporation, Los Angeles, Calif., a corporation of Nevada
No Drawing. Filed Mar. 8, 1961, Ser. No. 94,167
4 Claims. (Cl. 260—462)

The present invention is a continuation-in-part of our application, Serial No. 794,229 filed February 19, 1959, now abandoned.

This invention relates as indicated to a method for making organic monoborate salts and has particular reference to the preparation of the alkali metal and alkaline earth metal salts of glycol monoborates.

Sodium and potassium salts of various glycol monoborates have been known to those skilled in the art. However, these materials have found little or no use in industry due to the fact that they have been substantially insoluble in organic solvents, and also due to the fact that the prior art methods for obtaining these salts in substantially pure form have been costly and relatively inefficient. Consequently, the salts of glycol monoborates have not been exploited and their valuable properties have gone unknown.

We have found that the alkali metal salts of glycol monoborates prepared according to the method of the present invention have unique solubilities in organic solvents never before obtained by such salts prepared according to prior art methods.

The unique solubility in organic solvents of the present alkali metal salts of glycol monoborates make them particularly desirable as additives in a number of organic media. For example, the alkali metal salts of the glycol monoborates when prepared according to the present invention are soluble in organic hydraulic brake fluids, and when dissolved in such brake fluids impart alkalinity and are particularly effective as anti-corrosion agents. The alkali metal salts of glycol monoborates do not support combustion and can be used to impregnate certain resins to give them increased heat or flame resistance. The present alkali metal salts of glycol monoborates are soluble in jet aircraft fuels and when dissolved therein act as anti-icing agents. Still further, the salts of the glycol monoborates prepared according to the present invention are soluble in gasoline, and when added to gasoline act as an antiknock agent, increase the octane rating, and aid in preventing preignition of the gasoline.

It is, therefore, the principal object of this invention to provide a method for making alkali metal salts of glycol monoborates which are soluble in organic media and which method is economically desirable and provides good yields of substantially pure salts.

Other objects will become apparent as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few of the many ways in which the principle of the invention may be employed.

Broadly stated, the present invention comprises the method of making organic solvent soluble salts of glycol monoborates which comprises reacting an alkali metal with an excess of absolute methanol, reacting the resultant metal methoxide with a glycol monoborate in the presence of methanol, said glycol monoborate having about a 1:1 mole ratio of boron to glycol and having the general formula

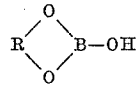

where R is an alkylene radical of 2 to 3 carbon atoms in length and containing from 6 to 10 carbon atoms, and recovering substantially pure salt from the reaction mass.

In the foregoing broadly stated paragraph, we have said that the alkali metal must be reacted with absolute methanol. It is important to note that the present reaction is carried out in the presence of methanol so as to perclude the presence of water during the reaction. This is of the utmost importance since we have found that the only way to produce an alkali metal salt of one of the defined glycol monoborates which is soluble in organic media, is to first produce an alkali metal methoxide using absolute methanol and then to react the resultant alkali metal methoxide with one of the defined glycol monoborates in excess methanol. By carrying out the reaction in this manner we have been able to exclude water from the reaction mass. We do not fully understand why alkali metal salts of glycol monoborates produced in this manner are soluble in organic media, whereas, alkali metal salts of glycol monoborates which are produced in the presence of water are insoluble in organic media. However, the fact remains that by using the present method salts are produced which have the extreme valuable property of being soluble in organic media, whereas the same salts when produced by prior art methods, all of which methods use the presence of water, are substantially completely insoluble in organic media.

It is also important in this regard to note that the glycol portion of the glycol monoborates have been defined as being an alkylene radical of 2 to 3 carbon atoms in length and containing from 6 to 10 carbon atoms. We have found that alkylene radicals containing less than 6 carbon atoms are undesirable since they produce salts which are substantially insoluble in organic media, and alkylene radicals containing more than 10 carbon atoms are economically undesirable. Additionally, we have also found that alkylene radicals of 2 to 3 carbon atoms in length produce materials which are the most desirable from a solubility standpoint.

I

Into a one liter three-necked round-bottomed flask equipped with a motor stirrer, a reflux condenser and a plug were added 300 ml. of absolute methanol and portion-wise with stirring 23 grams of metallic sodium. When reaction was complete (clear solution), 144 grams of hexylene glycol monoborate dissolved in 200 ml. of methanol was added to the flask. Methanol was then stripped from the flask until only a solid residue remained. The cooled residue was removed from the flask and heated under vacuum at 180° C. for about 4 hours. Chemical analysis of the resultant sodium hexylene glycol monoborate (sodium salt of 2-methyl-2,4-pentanediol boric acid) revealed the following data:

Na _____ 13.9% (theory 13.86%)
B _____ 6.51% (theory 6.52%)

II

Methanol (500 ml.) was added to a one liter three-necked flask equipped with a stirrer, reflux condenser and a nitrogen inlet tube. The flask was surrounded by an ice water bath and 39.1 grams of metallic potassium were added portion-wise to the methanol with stirring. When reaction was complete, 144 grams of hexylene glycol monoborate dissolved in 200 ml. of methanol was added.

The methanol was stripped and the potassium hexylene glycol monoborate (potassium salt of 2-methyl-2,4-pentanediol boric acid) was dried as above. Chemical analysis gave the following data:

K _____ 21.0% (theory 21.47%)
B _____ 5.81% (theory 5.94%)

III

Into a one liter three-necked flask equipped with a motor stirrer, reflux condenser and a plug was added 250 ml. of methanol. To this was added with stirring 6.94 grams of metallic lithium in small portions. When the reaction was complete (clear solution), 144 grams of hexylene glycol monoborate in 200 ml. of methanol was slowly added. The solution was stripped of methanol under water aspirator vacuum until a viscous solution remained. The remaining material was then poured into aluminum trays and dried in a vacuum oven at 180° C. Heating under vacuum was continued until the material became a glassy solid. The glassy material was removed from the oven, pulverized and returned to the oven and heated under vacuum at 180° C. for about two more hours. The resultant lithium hexylene glycol monoborate (lithium salt of 2-methyl-2,4-pentanediol boric acid) analyzed as follows:

Li _____ 4.65% (theory 4.68%)
B _____ 7.21% (theory 7.22%)

IV

Into a two liter three-necked flask equipped with a motor stirrer, reflux condenser and plug was introduced 1000 ml. of absolute methanol and 23 grams of metallic sodium with stirring. When the sodium methoxide reaction was completed (clear solution), 172.1 grams of 2,2,4-trimethyl-1,3-pentanediol monoborate was introduced. The excess methanol was stripped and the residue dried as in the foregoing examples. The resultant sodium 2,2,4-trimethyl-1,3-pentanediol monoborate was a white powdery solid which assayed as follows:

Na _____ 11.83% (theory 11.85%)
B _____ 5.56% (theory 5.58%)

As stated previously, it has been generally accepted by those skilled in the art that the alkali metal salts of the glycol monoborates are substantially insoluble in organic solvents. This is true of any such salts which have been prepared by the prior art methods. For example, sodium hexylene glycol monoborate, when prepared by the prior art methods, is for all practical purposes insoluble in gasoline. When sodium hexylene glycol monoborate is prepared according to the present method, it has a solubility in gasoline on the order of from about 12 to 15% by weight. These salts when added to gasoline in amounts of from about 0.01% to about 1.5% will increase the octane rating and aid in preventing preignition of the gasoline. Similarly, the alkali metal salts of the defined glycol monoborates when prepared according to prior art methods are substantially insoluble in jet aircraft fuel. The alkali metal salts of the defined glycol monoborates when prepared according to the present invention have a solubility in such jet aircraft fuel of about 12% by weight. These salts when added to jet aircraft fuel on the order of from about 0.01% to about 1% will prevent icing of the fuel down to a temperature of about −62° C., which is the freezing point of the fuel itself.

When an alkali metal salt of the defined glycol monoborate is prepared in the presence of water, as taught in all of the prior art methods, it shows a chemical analysis substantially identical with an alkaline metal salt of the defined glycol monoborate which is prepared according to the present invention. However, the unalterable fact remains that the alkali metal salt prepared by the prior art methods is substantially insoluble in organic media; whereas the alkali metal salts prepared by the present invention are substantially soluble in organic media, and this one physical characteristic can serve as a positive means of identifying which process the alkali metal salt was prepared by.

Other modes of applying the principle of the invention may be employed provided the features stated in any of the following claims or the equivalent of such be employed.

We, therefore, particularly point out and claim as our invention:

1. The method of making alkali metal salts of glycol monoborates which comprises reacting an alkali metal with an excess of absolute methanol, reacting the resultant metal methoxide with a glycol monoborate in the presence of methanol, said glycol monoborate having about a 1:1 mole ratio of boron to glycol and having the general formula

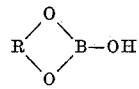

where R is an alkylene radical of 2 to 3 carbon atoms in length and containing from 6 to 10 carbon atoms, and recovering substantially pure salt from the resultant reaction mass.

2. The method of making the sodium salt of 2-methyl-2,4-pentanediol boric acid which comprises reacting metallic sodium with an excess of absolute methanol, reacting the resultant sodium methoxide with a hexylene glycol monoborate in the presence of methanol, and recovering substantially pure sodium hexylene glyol monoborate.

3. The method of making the potassium salt of 2-methyl-2,4-pentanediol boric acid which comprises reacting metallic potassium with an excess of absolute methanol, reacting the resultant potassium methoxide with a hexylene glycol monoborate in the presence of methanol, and recovering substantially pure potassium hexylene glycol monoborate.

4. The method of making the lithium salt of 2-methyl-2,4-pentanediol boric acid which comprises reacting metallic lithium with an excess of absolute methanol, reacting the resultant lithium methoxide with a hexylene glycol monoborate in the presence of methanol, and recovering substantially pure lithium hexylene glycol monoborate.

References Cited in the file of this patent

FOREIGN PATENTS 511,641   Great Britain _____ Aug. 22, 1939

OTHER REFERENCES

Morrell et al.: J. Am. Chem. Soc., vol 67, pages 879–880 (1945).
Noller: Chemistry of Organic Compounds, W. B. Saunders Co., Philadelphia, 1951, pages 87 to 88.
Lappert: Chem Reviews, vol. 56, page 992 (1956).
Steinberg et al.: Ind. and Eng. Chem., vol. 49, pages 174–181 (1957).